(12) United States Patent  (10) Patent No.: US 8,584,229 B2
Brutch et al.  (45) Date of Patent: Nov. 12, 2013

(54) METHODS AND APPARATUS SUPPORTING ACCESS TO PHYSICAL AND VIRTUAL TRUSTED PLATFORM MODULES

(75) Inventors: Tasneem Brutch, Cornelius, OR (US); Alok Kumar, Santa Clara, CA (US); Murari Kumar, Santa Clara, CA (US); Kalpana M. Roge, Cumming, GA (US); Vincent R. Scarlata, Beaverton, OR (US); Ned M. Smith, Beaverton, OR (US); Faraz A. Siddiqi, Portland, OR (US); Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1141 days.

(21) Appl. No.: 11/963,336

(22) Filed: Dec. 21, 2007

(65) Prior Publication Data
US 2009/0165117 A1  Jun. 25, 2009

(51) Int. Cl.
*G11C 7/00* (2006.01)
(52) U.S. Cl.
USPC .......... 726/21; 380/279; 726/1; 726/9; 718/1; 718/102; 713/150; 713/100; 713/166; 711/154; 711/E12.001; 712/225; 712/E9.001
(58) Field of Classification Search
USPC .......................................................... 726/21
See application file for complete search history.

(56) References Cited

U.S. PATENT DOCUMENTS

| 6,075,938 | A  | * | 6/2000 | Bugnion et al. ................ 703/27 |
| 7,076,655 | B2 |   | 7/2006 | Griffin et al. |
| 7,222,062 | B2 |   | 5/2007 | Goud et al. |
| 7,380,119 | B2 |   | 5/2008 | Bade et al. |
| 8,249,257 | B2 | * | 8/2012 | Brutch et al. ................. 380/279 |
| 2002/0194482 | A1 |   | 12/2002 | Griffin et al. |
| 2002/0194496 | A1 | * | 12/2002 | Griffin et al. ................. 713/200 |
| 2003/0115453 | A1 |   | 6/2003 | Grawrock |
| 2004/0264797 | A1 |   | 12/2004 | Lippincott et al. |
| 2005/0060568 | A1 | * | 3/2005 | Beresnevichiene et al. .. 713/200 |
| 2005/0132122 | A1 |   | 6/2005 | Rozas |
| 2005/0235141 | A1 | * | 10/2005 | Ibrahim et al. ................ 713/164 |

(Continued)

FOREIGN PATENT DOCUMENTS

WO  WO 02/06929 A2  1/2002

OTHER PUBLICATIONS

Scorp, "Talking Shop: Can you trust trusted computing?", 2003.*

(Continued)

*Primary Examiner* — Krista Zele
*Assistant Examiner* — Ondrej Vostal
(74) *Attorney, Agent, or Firm* — Trop, Pruner & Hu, P.C.

(57) ABSTRACT

A data processing system features a hardware trusted platform module (TPM), and a virtual TPM (vTPM) manager. When executed, the vTPM manager detects a first request from a service virtual machine (VM) in the processing system, the first request to involve access to the hardware TPM (hTPM). In response, the vTPM manager automatically determines whether the first request should be allowed, based on filter rules identifying allowed or disallowed operations for the hTPM. The vTPM manager may also detect a second request to involve access to a software TPM (sTPM) in the processing system. In response, the vTPM manager may automatically determine whether the second request should be allowed, based on a second filter list identifying allowed or disallowed operations for the sTPM. Other embodiments are described and claimed.

20 Claims, 3 Drawing Sheets

(56) References Cited

U.S. PATENT DOCUMENTS

| | | | |
|---|---|---|---|
| 2005/0286792 A1 | 12/2005 | Mehta et al. | |
| 2006/0002471 A1 | 1/2006 | Lippincott et al. | |
| 2006/0020781 A1 | 1/2006 | Rozas et al. | |
| 2006/0026418 A1* | 2/2006 | Bade et al. | 713/150 |
| 2006/0140501 A1 | 6/2006 | Tadas | |
| 2006/0230401 A1* | 10/2006 | Grawrock | 718/1 |
| 2006/0236125 A1 | 10/2006 | Sahita et al. | |
| 2006/0236127 A1* | 10/2006 | Kurien et al. | 713/193 |
| 2006/0256108 A1* | 11/2006 | Scaralata | 345/418 |
| 2007/0043896 A1 | 2/2007 | Daruwala et al. | |
| 2007/0079120 A1* | 4/2007 | Bade et al. | 713/166 |
| 2007/0192864 A1* | 8/2007 | Bryant et al. | 726/23 |
| 2008/0148048 A1* | 6/2008 | Govil et al. | 713/164 |
| 2008/0155208 A1* | 6/2008 | Hiltgen et al. | 711/154 |
| 2008/0155223 A1* | 6/2008 | Hiltgen et al. | 711/173 |
| 2008/0178176 A1* | 7/2008 | Berger et al. | 718/1 |
| 2008/0184212 A1* | 7/2008 | Lee et al. | 717/148 |
| 2008/0189707 A1* | 8/2008 | Ibrahim et al. | 718/102 |
| 2008/0222309 A1* | 9/2008 | Shanbhogue | 709/250 |
| 2009/0044187 A1* | 2/2009 | Smith et al. | 718/1 |
| 2009/0049510 A1* | 2/2009 | Zhang et al. | 726/1 |
| 2009/0055641 A1* | 2/2009 | Smith | 713/160 |
| 2009/0086979 A1* | 4/2009 | Brutch et al. | 380/279 |
| 2009/0125974 A1* | 5/2009 | Zhang et al. | 726/1 |
| 2010/0223611 A1* | 9/2010 | Mahalingam et al. | 718/1 |

OTHER PUBLICATIONS

Oppliger et al., "Does Trusted Computing Remedy Computer Security Problems?", 2005.*

Hierarchies, "Architecture", usenix, May 2006.*

Berger et al., "vTPM: Virtualizing the Trusted Platform Module", 2006.*

England et al., "Virtual Machines for enterprise desktop security", 2006.*

Zheng et al., "A Mechanism for Trust Sustainability Among Trusted Computing Platforms", 2004.*

Abadi, "Trusted computing, trusted third parties, and verified communications".*

Kauer, "Authenticated booting for L4", 2004.*

Anderson, "'Trusted Computing' Frequencty Asked Questions", 2003.*

TCG et al., "TPM Main Part 2 TPM Structures", Mar. 2006.*

LeVasseur et al., "Pre-Virtualization: Slashing the Cost of Virtualization".*

Moller, "Virtual Machine Benchmarking", Apr. 2007.*

D'Chunha, "Exploring the Integration of Memory Management and Trusted Computing", May 2007.*

Basit, "Approaches for Attesting Virtualized Environments".*

Gurgens et al., "Security evaluation of scenarios based on the TCG's TPM Specification", 2007.*

Nancy Sumrall, et al., "Trusted Computing Group (TCG) and the TPM 1.2 Specification", Intel Developer Forum, pp. 1-32.

Charles Scott Powell, "Foundations for Trusted Computing, Net Project", Nov. 7, 2002, London, England, pp. 1-87.

"Trusted Computing Platform Alliance (TCPA) Main Specification Version 1.1b", Trusted Computing Group, Inc. 2003, pp. 1-332.

"TPM Main Part 1 Design Principles, Specification Version 1.2 Revision 62", Trusted Computing Group, Oct. 2, 2003, pp. 1-161.

Mario Strasser, "A Software-Based TPM Emulator for Linux", *Semester Thesis, Department of Computer Science*, Jul. 2004. pp. 1-56, Zurich, Switzerland.

Tal Garfinkle, et al. "Terra: A Virtual Machine-Based Platform for Trusted Computing", Computer Science Department, Stanford University, Oct. 19, 2003, pp. 1-14.

PCT International Search Report for Application No. PCT/US2005/019724, filed Jun. 3, 2005, mailed Sep. 5, 2005.

Vincent Scarlata, Method and Apparatus for Remotely Provisioning Software-Based Security Coprocessors, U.S. Appl. No. 11/171,880, filed Jun. 29, 2005.

Vincent Scarlata, Method and Apparatus for Generating Endorsement Credentials for Software-Based Security Coprocessors, U.S. Appl. No. 11/171,856, filed Jun. 29, 2005.

Vincent Scarlata, Method and Apparatus for Providing Software-Based Security Coprocessors, U.S. Appl. No. 11/171,133, filed Jun. 29, 2005.

"What is Trusted Grub?", Applied Data Security Group, http://www.prosec.rub.de/trusted_grub.html.

VMware Inc., "VMware Reinvents Enterprise Desktop Management and Security with Breakthrough New Product", Sep. 20, 2004, http://www.wmware.com/new/releases/ace_announce.html.

Barham et al., "Xen and the Art of Virtualization", University of Cambridge Computer Laboratory, pp. 14, 2003. Last accessed Jan. 29, 2008, http://www.cl.cam.ac.uk/Research/SRG/netos/papers/2003-xensosp.pdf.

George W. Dunlap, et al. "ReVirt: Enabling Intrusion Analysis through Virtual-Machine Logging and Replay", Proceedings of the 2002 Symposium on Operating Systems Design and Implementation, pp. 1-14, http://www.eecs.umich.edu/CoVirt/papers/revirt.pdf.

Joan G. Dyer et al., "Building the IBM 4758 Secure Processor", Oct. 2001, pp. 1-10, http://ieeexplore.org/iel5/20660/00955100.pdf?arnumber=955100.

Fraser et al., "Safe Hardware Access with the Xen Virtual Machine Monitor", University of Cambridge Computer Laboratory, pp. 10. Last accessed Jan. 29, 2008, http://www.cl.cam.ac.uk/Research/SRG/netos/papers/2004-oasis-ngio.pdf.

Garfinkle et al., "TERRA: A Virtual Machine-Based Platform for Trusted Computing", (presentation), Nov. 10, 2004, pp. 23. Last accessed on Jan. 29, 2008, http://www.cs.utexas.edu/~shmat/courses/cs395t_fall04/rager.pdf.

The Trusted Computing Group, "What is the Trusted Computing Group?" (Internet home page) 2005, http://www.trustedcomputing-group.org/home.

John Marchensini, et al., "Experimenting with TCPA/TCG Hardware", Computer Science Technical Report TR2003-476, Dec. 15, 2003, pp. 1-20, http://www.cs.dartmouth.edu/~sws/papers/mswm03.pdf.

Meushaw et al., "NetTop: Commercial Technology in High Assurance Applications", Tech Trend Notes, vol. 9, ed. 4, Research and Advanced Technology Publication, Fall 2000, pp. 9. Last accessed on Jan. 29, 2008, http://www.vmware.com/pdf/TechTrendNotes.pdf.

David Afford "The Need for TCPA", IBM Research, Oct. 2002, pp. 7. Last Accessed Jan. 29, 2008, http://www.research.ibm.com/gsal/tcpa/why_tcpa.pdf.

Sailer et al., "Design and Implementation of a TCG-based Integrity Measurement Architecture", IBM Research Report; IBM Research Division, New York, pp. 1-17. Last Accessed on Feb. 7, 2008, http://www.ece.cmu.edu/~adrian/630-f04/readings/sailer-zhang-jaeger-doorn-2004.pdf.

Michael, M. Swift et al., "Improving the Reliability of Commodity Operating Systems", Department of Computer Science and Engineering, University of Washington, Oct. 2003, pp. 1-16, http://www.cs.rochester.edu/sosp2003/papers/p116-swift.pdf.

Vincent Scarlata, Method and Apparatus for Migrating Software-Based Security Coprocessors, U.S. Appl. No. 11/171,134, filed Jun. 29, 2007.

Stefan Berger et al., "vTPM: Virtualizing the Trusted Platform Module"; Security '06: 15th USENIX Security Symposium, IBM T.J. Watson Research Center, Hawthorne, NY USENIX Association, pp. 305-320.

Sadeghi et al., "Property-based Attestation for Computing Platforms: Caring about properties, not mechanisms", Available from http://delivery.acm.org/10.1145/1070000/1066038/p67-sadeghi.pdf?key1=1066038&key2=4269876511&coll=&dl=ACM&CFID=15151515&CFTOKEN=6184618.

Rozas, et al., Dynamic Measurement of an Operating System in a Virtualized System, U.S. Appl. No. 11/513,963, filed Aug. 31, 2006.

N. Petroni et al., "Copilot—a Coprocessor-based Kernel Runtime Integrity Monitor" (http://www.usenix.org/publications/library/proceedings/sec04/etch/full_papers/petroni/petroni.pdf) Proceedings of the 13th USENIX Security Symposium, Aug. 9-13, 2004.

(56) References Cited

OTHER PUBLICATIONS

David Grawrock, The Intel Safer Computing Initiative: Building Blocks for Trusted Computing, Intel Press, Jan. 2006.
Intel Trusted Execution Technology: Preliminary Architecture Specification, Intel Corp., Nov. 2006.
Mechanisms to Control Access to Cryptographic Keys and to Attest to the Approved Configurations of Computer Platforms, U.S. Appl. No. 11/511,773, filed Aug. 29, 2006.
David W. Grawrock, Platform Configuration Register Virtualization Apparatus, Systems, and Methods, U.S. Appl. No. 11/095,034, filed Mar. 31, 2004.
Intel Corporation, New Client Virtualization Usage Models Using Intel Virtualization Techonology, Intel Techonology Journal, vol. 10, Issue 03, Aug. 10, 2006, pp. 1-14.
Ned Smith, Methods and Apparatus for Providing Upgradeable Key Bindings for Trusted Platform Modules, Pending U.S. Appl. No. 11/863,233, filed Sep. 27, 2007.
Ned Smith, Methods and Apparatus for Creating an Isolated Partition for a Virtual Trusted Platform Module, Pending U.S. Appl. No. 11/837,378, filed Aug. 10, 2007.
Tasneem Brutch, Virtual TPM Keys Rooted in a Hardware TPM, Pending U.S. Appl. No. 11/864,512, filed Sep. 28, 2007.

* cited by examiner

METHODS AND APPARATUS SUPPORTING ACCESS TO PHYSICAL AND VIRTUAL TRUSTED PLATFORM MODULES

FIELD OF THE INVENTION

The present disclosure relates generally to the field of data processing, and more particularly to methods and related apparatus for supporting access to physical and virtual trusted platform modules.

BACKGROUND

A data processing system may include hardware resources, such as a central processing unit (CPU), random access memory (RAM), read-only memory (ROM), etc. The processing system may also include software resources, such as a basic input/output system (BIOS), a virtual machine monitor (VMM), and one or more operating systems (OSs). When the computer system is started or reset, it may load the BIOS, and then the VMM. The VMM may run on top of a host OS, or the VMM may be implemented as a hypervisor that includes control which serves more or less as a host OS. The VMM may create one or more virtual machines (VMs), and the VMs may boot to different guest OSs or to different instances of the same guest OS. A guest OS that provides the VMM with facilities for managing certain aspects of the processing system pertaining to virtualization may be referred to as a service OS. The VMM may thus allow multiple OSs and applications to run in independent partitions. The article entitled "Intel® Virtualization Technology for Directed I/O," in issue no, 03, volume no. 10, of the Intel® Technology Journal (the "VT-d article") provides additional information about some virtualization frameworks. The VT-d article is currently available from the Internet at http://download.intel.com/technology/itj/2006/v10i3/v10-i3-art02pdf.

The CPU in a data processing system may provide hardware support (e.g., instructions and data structures) for virtualization. Additional details about virtualization may be found in reference manuals such as the following:

Intel® Virtualization Technology Specification for the IA-32 Intel® Architecture, dated April 2005 (the VT-x specification"); and IA-32 Intel® Architecture Software Developer's Manual, Volume 2B: Instruction Set Reference, N-Z, dated June 2006.

Different types of processors may provide different features for supporting virtualization. A processing system may also include features referred to as LaGrande Technology (LT), or Intel® Trusted Execution Technology (TXT), as developed by Intel Corporation. The LT/Intel® TXT features may provide for the protected measurement and launching of a VMM. Additional details concerning LT are provided in the publication entitled "The Intel Safer Computing Initiative: Building Blocks for Trusted Computing." Additional details concerning Intel® TXT are provided in the publication entitled "Intel® Trusted Execution Technology Preliminary Architecture Specification," dated November 2006 (the "Intel® TXT specification"). The Intel® TXT specification is currently available from the Internet at http://www.intel.com/technology/security/downloads/315168.htm. Different types of processors may provide different features to provide for the protected measurement and launching of a VMM.

In addition to RAM and one or more CPUs, a processing system may include a security component, such as a trusted platform module (TPM). A TPM is a hardware component that resides within a processing system and provides various facilities and services for enhancing the security of the processing system. For example, a TPM may be implemented as an integrated circuit (IC) or semiconductor chip, or as a part of an integrated circuit, and the TPM may be used to protect data and to attest to the runtime configuration of a platform. A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is currently available from the Internet at www.trustedcomputinggroup.org/home.

In general, a TCG-compliant TPM provides security services such as attesting to the identity and/or integrity of the platform, based on characteristics of the platform. For instance, trusted computing technologies may provide facilities for measuring, recording, and reporting the software configuration of a platform. For instance, the measurements may include load-time measurements of software.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other platforms or devices for processing or transmitting information.

Figure 1:
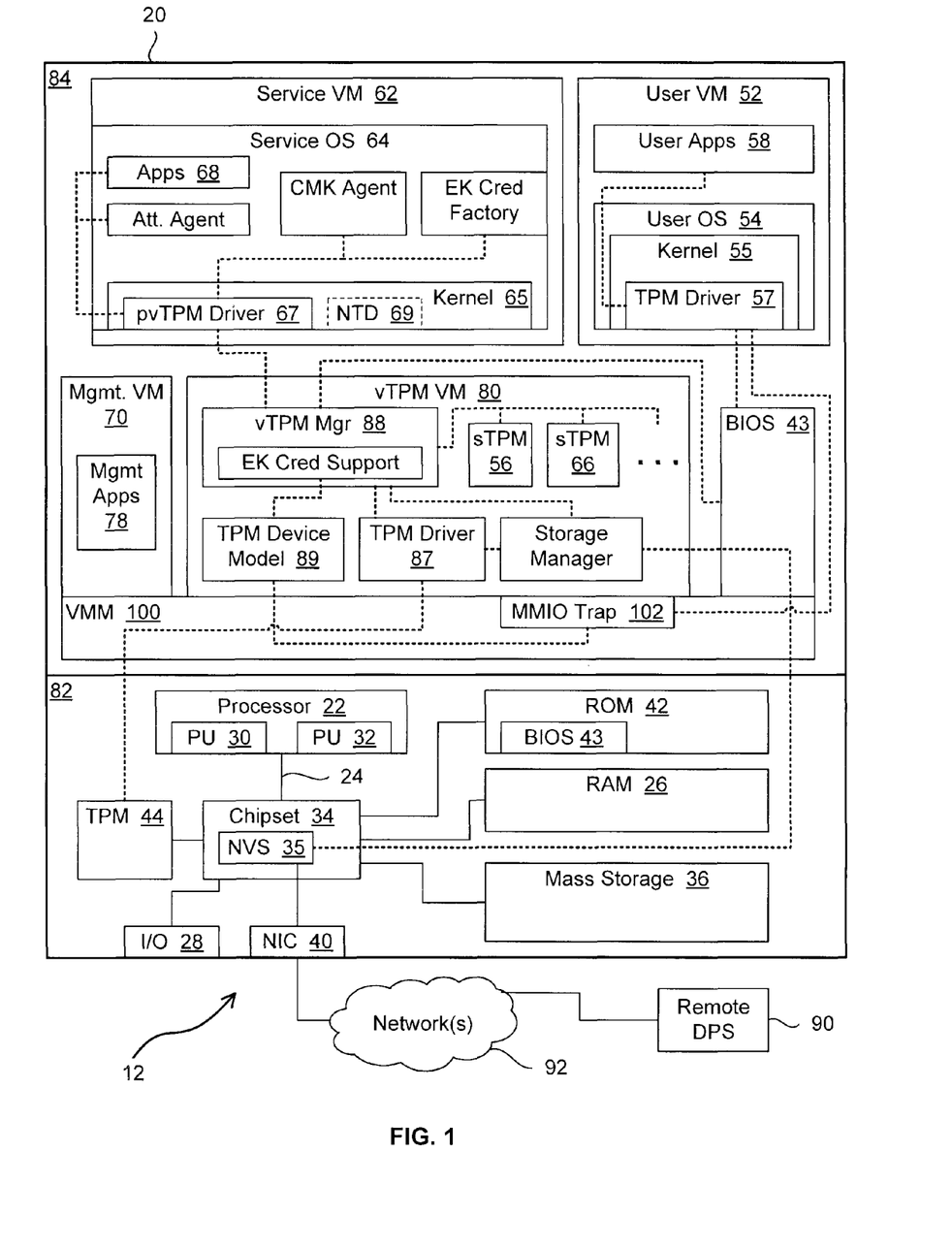
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware components 82, such as a processor or CPU 22 and various other components, which may be communicatively coupled via one or more system buses 24 or other communication pathways or mediums.

This disclosure uses the term "bus" to refer to shared communication pathways, as well as point-to-point pathways. Processor 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

In the embodiment of FIG. 1, processor 22 is communicatively coupled to one or more volatile or non-volatile data storage devices, such as RAM 26, ROM 42, mass storage devices 36 such as hard drives, and/or other devices or media, such as floppy disks, optical storage, tapes, flash memory, memory sticks, digital versatile disks (DVDs), etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as a video controller, integrated drive electronics (IDE) controllers, small computer system interface (SCSI) controllers, universal serial bus (USB) controllers, input/output (I/O) ports 28, input devices, output devices such as a display, etc. A chipset 34 in processing system 20 may serve to interconnect various hardware components. Chipset 34 may include one or more bridges and/or hubs, as well as other logic and storage components. In the example embodiment, processor 22 is communicatively coupled to a TPM 44 via chipset 34. TPM 44 may also be referred to as the hardware TPM (hTPM) 44.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 90, such as through a network interface controller (NIC) 40, a modem, or other communication ports or couplings. Processing systems may be interconnected by way of a physical and/or logical network 92, such as a local area network (LAN), a wide area network (WAN), an intranet, the Internet, etc. Communications involving network 92 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Some components may be implemented as adapter cards with interfaces (e.g., a PCI connector) for communicating with a bus. In some embodiments, one or more devices may be implemented as embedded controllers, using components such as programmable or non-programmable logic devices or arrays, application-specific integrated circuits (ASICs), embedded processors, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 84. The software environment 84 may include BIOS components, system management mode (SMM) components, OS components, VMM components, user applications, etc. For example, some or all of the code to implement a BIOS 43 may be stored in ROM 42.

Processing systems may include embedded information technology (EIT) that supports system management. For instance, an EIT platform may support verified boot using Intel® TXT and capabilities of a TPM. In addition, a virtual machine (VM) in the platform may make use of core capabilities of a TPM. Such a VM may run a user OS such as Microsoft® Windows Vista™, for example. However, a conventional platform may be unable to share a hardware TPM among multiple VMs while maintaining security guarantees of the TPM.

By contrast, an EIT platform may provides each of multiple VMs with its own virtualized or virtual TPM (vTPM). Such a platform may maintain security guarantees of the vTPMs and the underlying hardware TPM.

One architecture for providing VMs with vTPMs may use a distinct software TPM (sTPM) to hold the context for the vTPM of each VM. In an example embodiment, each partition may have an sTPM context in which both temporal and persistent state is managed.

For instance, in processing system 20, a guest VM or user VM 52 may run a user OS 54, and the platform may use an sTPM 56 to maintain context for a vTPM for that VM. As used herein, the term "vTPM" refers to an sTPM for a VM, in conjunction with some or all of the associated control logic for providing TPM services for that VM. User OS 54 may include a kernel 55 with a TPM driver 57. User VM 52 may also include various guest applications 58.

In the embodiment of FIG. 1, processing system 20 also includes a host VM or service VM 62 that runs a service OS 64, such as Linux. Service OS 64 may include an attestation agent, a certifiable migratable key (CMK) agent, an endorsement key (EK) credential factory, and other service applications 68. Processing system 20 may use another sTPM 66 to hold the context for a vTPM for service VM 62. Service VM 62 may provide management and security services to support remote management of processing system 20.

Service OS 64 may include a kernel 65 with a para-virtualized TPM driver 67. Para-virtualized TPM driver 67 may include control logic that is designed to support operations on the physical TPM (e.g., attestation of the environment using the physical TPM, sealing secrets in the physical TPM, and the provisioning of values in the physical TPM to support verified boot).

For purposes of this disclosure, a para-virtualized driver (pv-driver) is a driver that is "aware" that it is executing within a virtual machine. In the embodiment of FIG. 1, para-virtualized TPM driver 67 (pv-TPM-driver 67) uses this awareness to generate commands with routing information for directing the commands to desired TPMs. In other words, pv-TPM-driver 67 can pick which TPM it talks to, either explicitly or implicitly. For instance, pv-TPM-driver 67 may mark some commands for delivery to hTPM 44 and others to the vTPM for service VM 62. Based on the routing information for a pv-TPM-driver command, the virtualization layer may intelligently route the command to the desired TPM.

In the embodiment of FIG. 1, pv-TPM-driver 67 uses one set of operation codes (opcodes) for vTPM commands, and a different set for hTPM commands. The different opcodes instruct the virtualization layer whether those commands are directed to hTPM 44 or to the vTPM for the service VM 62. In another embodiment, the pv-TPM-driver may use an optional driver field, parameter, or flag for some commands to specify the target TPM.

In another embodiment, the service VM includes two separate TPM drivers. One driver may be a more or less standard driver, with commands automatically routed to the vTPM for the service VM. Such a driver is illustrated in FIG. 1, with dashed lines, as native TPM driver (NTD) 69. The other driver may be referred to as a maintenance TPM driver or a privileged TPM driver. To direct commands to the hardware TPM, the maintenance TPM driver may use parameters or different opcodes, as indicated above. Those parameters or opcodes may serve as explicit routing information, specifying the target TPM. Alternatively, the maintenance driver may issue the commands on a different communication channel from the standard driver.

For instance, the standard driver may write commands to a standard TPM memory address (e.g., 0xFED4xxxx), which is captured by an MMIO trap, delivered to a device model in a vTPM VM, and then delivered to a vTPM manager in the vTPM VM. By contrast, the maintenance TPM driver may use a VM inter-process communication (IPC) channel such as a shared memory page with the vTPM Manager to directly deliver the command to the vTPM Manager. The communication channel used may serve as implicit routing info, in that the particular channel used for a command dictates the TPM to be used by that command.

In the embodiment of FIG. 1, pv-TPM-driver 67 does not communicate directly with the hardware interface of TPM 44, as commands are filtered by a vTPM manager 88 within a vTPM VM 80, as explained in greater detail below. Nevertheless, pv-TPM-driver 67 is aware that requests or commands may be dropped, whereas a standard driver might take steps to disable the interface if a command were dropped. Hence, pv-TPM-driver 67 is aware of that fact that it is, at least partially, virtualized.

Processing system 20 also includes a management VM 70 with various management applications 78 to provide device virtualization. For instance, management applications 78 may handle security configuration, scheduling configuration, and hardware configuration for the other VMs. Thus, the applications in management VM 70 may control which VMs can use NIC 40, which VMs can use various input/output devices, etc. In the example embodiment, management VM 70 has special execution privileges, such as direct access to devices and hardware.

Processing system 20 also has a separate partition, such as vTPM VM 80, for providing vTPMs for other VMs, such as user VM 52 and service VM 62. The term "partition" may be used to refer to an isolated execution environment, a VM, or any similar environment for maintaining separation between operating environments. In the example embodiment, vTPM VM 80 includes a vTPM manager 88 with EK credential support. A TPM driver 87 and a TPM device model 89 may also reside in vTPM VM 80. In addition, vTPM VM 80 may include the sTPMs for other VMs, such as sTPM 56 and sTPM 66, as well as a storage manager for providing storage services. For instance, the storage manager may save persistent state into nonvolatile storage (NVS) 35 in chipset 34. In addition, vTPM manager 88 may apply a cryptographic wrapper to protect the persistent state from tampering.

Processing system 20 also has a VMM 100 with a memory-mapped input/output (MMIO) trap 102. The dashed lines in FIG. 1 illustrate which components communicate with which other components to implement vTPMs. For instance, FIG. 1 has dashed lines between TPM driver 57, MMIO trap 102, TPM device model 89, vTPM manager 88, and sTPM 56. Those dashed lines illustrate that MMIO trap 102 intercepts communications from the TPM drivers and directs them to vTPM VM 80, via TPM device model 89, to be handled with the context from the appropriate sTPM. In alternative embodiments, some or all of the components of the vTPM VM may be implemented within the VMM. The VMM may be implemented as control logic that runs on top of a host OS, or as a hypervisor that directly accesses hardware without any underlying host OS.

In one embodiment, the processing system may provide VMs that serve as virtual appliances (VAs). For instance, different VAs may provide different features, such as security, manageability, HD-Audio, etc. The VAs may use platform ingredients such as physical TPM 44, Intel® Virtualization Technology (Intel® VT) for Directed I/O (Intel® VT-d), Intel® VT for IA-32 Intel® Architecture (Intel® VT-x), Intel® Trusted Execution Technology (Intel® TXT), and Intel® Active Management Technology (Intel® AMT). Control logic to provide for active management may reside partially of completely in NIC 40, for instance.

In one embodiment, the processing system includes a memory controller hub (MCH) that contains a manageability engine (ME), and the system firmware includes BIOS 43 in ROM 42 and AMT control logic in NIC 40. In addition, virtualization firmware containing code to implement VMM 100 and VA instances may be stored in ROM 42 or mass storage 36, in a reserved storage partition dedicated for VA use.

Unlike the user VMs, the VA VMs may not be directly controlled by users, and may provide well-guarded control logic to implement features such as security and system manageability. However, each VA and each user VM may run applications that are unaware of virtualization and that expect to use TPM resources.

The platform ingredients are used to implement platform capabilities that include boot verification, which is the ability to cryptographically verify code integrity before it is executed (e.g., as part of the VA launch process). In one embodiment, the hardware TPM is critical to booting the system properly (with verifications for the VAs), and the hardware TPM therefore cannot be used exclusively by a particular VA or user OS (UOS). In such an embodiment, virtualization of the TPM (e.g. a vTPM) is needed to allow every environment (virtual and physical) to have its own TPM context.

In addition, some VMs, such as one running Microsoft® Windows Vista™ as the UOS, may use core capabilities of a TPM. Consequently, sharing the hardware TPM may not be viable, while maintaining security guarantees for the TPM. To address such considerations, the embodiment of FIG. 1 provides multiple VMs, including service VM 62 and User VM 52. However, in alternative embodiments, the design may be extended to support a virtualized TPM for any arbitrary number of VMs.

Each VM has a software TPM (sTPM) context in which both temporal and persistent state is managed. Persistent state is saved into chipset NV using a storage manager. Persistent state is protected from tampering by a cryptographic wrapper that is applied by the vTPM Manager.

UOS applications access a virtual TPM through a native TPM driver. The TPM for user VM 52 is fully virtualized. The UOS may call ACPI functions, for example to assert physical presence, which may require system reboots and can affect the state of the physical TPM. A virtualized ACPI table implementation in BIOS may prevent ACPI functions made in the context of the virtualized UOS from reaching the hardware TPM without first being captured by VMM 100.

SOS applications access a fully-virtualized TPM through native TPM driver 57. In one embodiment, neither the service VM, nor any other VM, should be permitted to have complete control of the hardware TPM under any circumstances. However, isolated cases exist where the service OS may need access to capabilities of TPM 44 (e.g., for attestation). Processing system 20 allows partial access to TPM 44 from a trusted VM (e.g., service VM 62) by using para-virtualized TPM (pvTPM) driver 67. Agents in service OS 64 can use pv-TPM-driver 67 to access hTPM functionality. All accesses to hTPM 44 are communicated to vTPM Manager 88. vTPM manager 88 may filter hTPM commands based on policy, and vTPM manager 88 may pass only allowed commands to hTPM 44. The pv-TPM-driver also allows service OS components (e.g., the credential factory, the storage service, and the attestation agent) to interact with vTPM components. For instance, service OS 64 may use vTPM components to provide a well-guarded security and manageability solution.

As explained in greater detail below, attempts to access a TPM from TPM driver 57 and pv-TPM-driver 67 are trapped in VMM 100, and vTPM manager 88 sends the commands to the appropriate sTPM for processing. Thus, vTPM manager 88 synchronizes the accesses to sTPM instances. The results are then communicated back to the appropriate OS. In the illustrated embodiment, all of the calls from pv-TPM-driver 67 are sent to vTPM Manager 88 for further processing.

Figure 2:
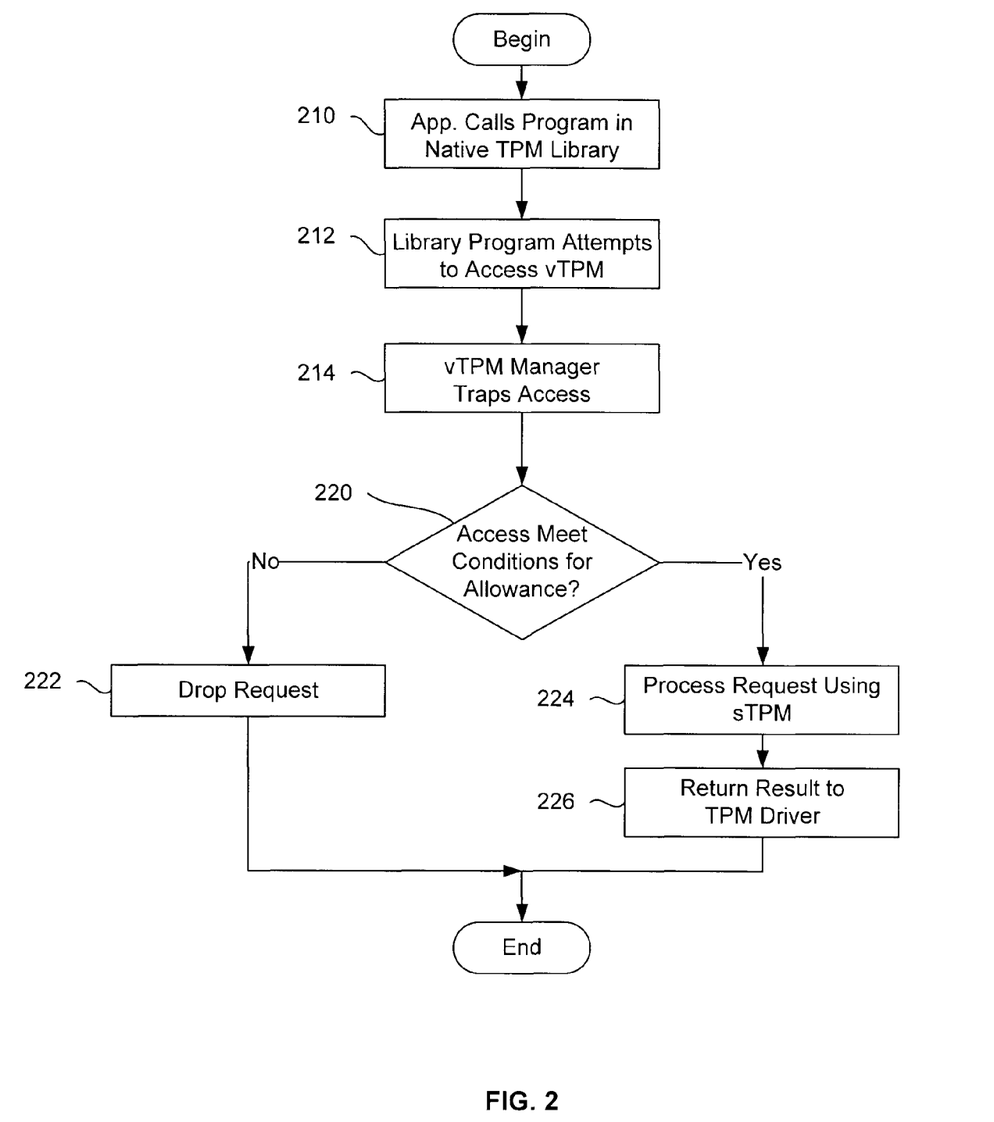
FIG. 2 is a flowchart of an example embodiment of a process for supporting access to a virtual TPM in the processing system of FIG. 1.
Figure 3:
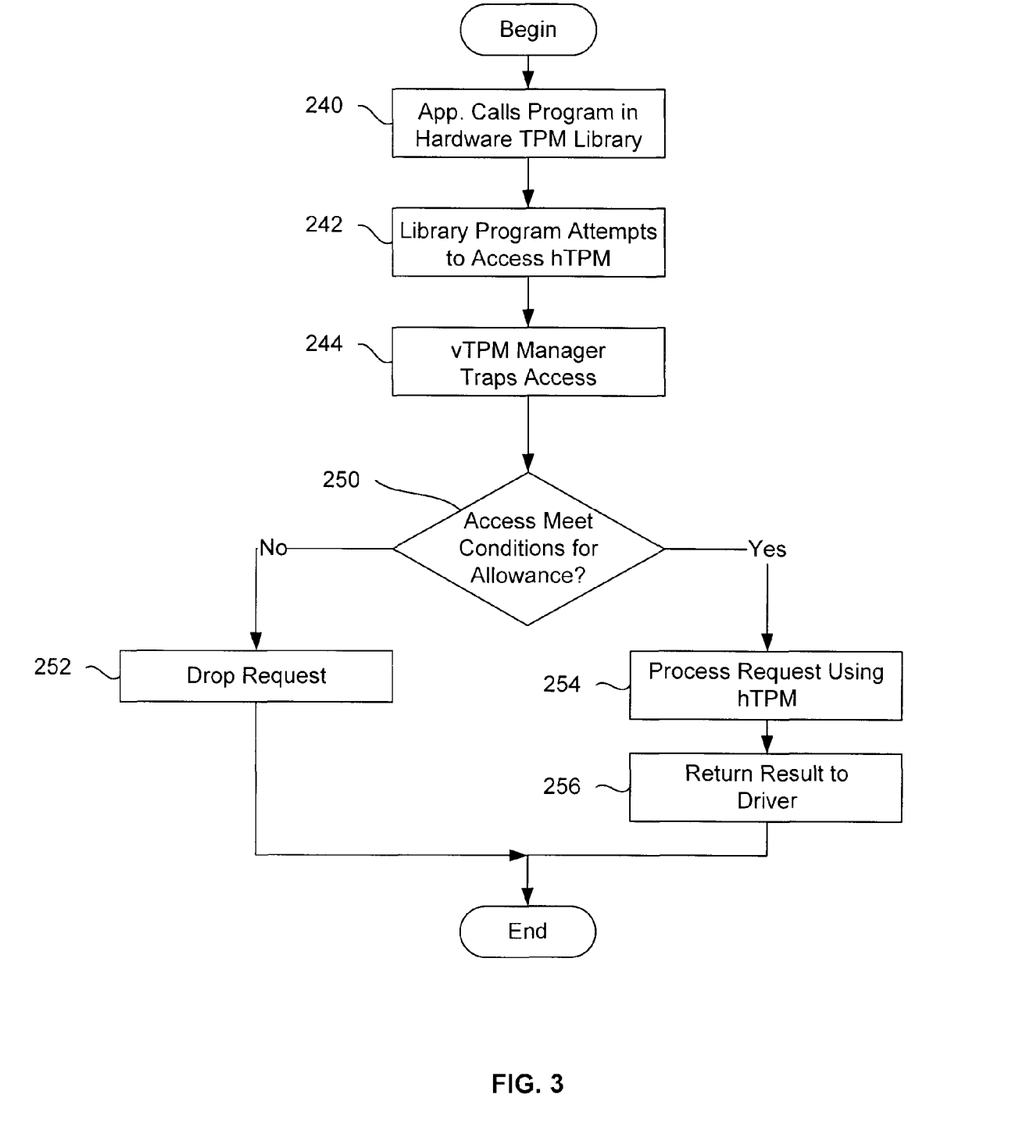
FIG. 3 is a flowchart of an example embodiment of a process for supporting access to a physical TPM in the processing system of FIG. 1.

FIG. 2 is a flowchart of an example embodiment of a process for supporting access to virtual TPMs in processing system 20. FIG. 3 is a flowchart of an example embodiment of a process for supporting access to a physical TPM in processing system 20.

The illustrated processes begin after processing system 20 has booted BIOS 43 and launched VMM 100, management VM 70, vTPM VM 80, service VM 62, and user VM 52. Processing system 20 has also loaded vTPM manager 88 into vTPM VM 80, has loaded other virtual machine management programs into management VM 70, has loaded service OS 64 into service VM 62, and has loaded user OS 54 and user applications 58 into user VM 52. Also, vTPM manager 88 will have already created sTPM 56 and sTPM 66 for user VM 52 and service VM 62, respectively, and will have instantiated vTPMs for user VM 52 and service VM 62.

In one embodiment, TPM driver 57 and TPM driver 87 are the same driver, but they are configured to point to different devices or addresses. For instance, TPM driver 57 may point to addresses associated with sTPM 56, while TPM driver 87 may point to addresses associated with hardware TPM 44. Alternatively, the user VMs and the vTPM VM may use different TPM drivers.

As explained in greater detail below, after user VM 52 and service VM 62 have been launched or spawned, VMM 100 and vTPM VM 80 may cooperate to provide vTPM services for user VM 52 and service VM 62.

In the embodiment of FIG. 1, TPM driver 57 is a native TPM driver. In other words, TPM driver 57 provides an application program interface (API) that accepts the standard TPM calls defined in a publicly available specification such as the TPM Specification. TPM driver 57 may also include a library of functions for servicing such calls. For instance, TPM driver 57 may support standard calls such as TPM_Quote, TPM_N-V_WriteValue, etc.

The API for pv-TPM-driver 67 may also accept standard TPM calls to be directed to the vTPM for service VM 62, and pv-TPM-driver 67 may include a library of functions for servicing such calls. In addition, pv-TPM-driver 67 may include control logic that allows programs in service VM to direct commands to hTPM 44. Such control logic may be implemented as a separate library of functions, or as part of the library which supports standard TPM calls. As explained above, pv-TPM-driver 67 may use new, customized calls for accessing hardware TPM functions (e.g., hTPM_Quote, hTPM_NV_WriteValue, etc.). Alternatively, a pv-TPM-driver may use command arguments to direct commands to the hTPM.

As shown at block 210 of FIG. 2, once the environment has been established, a program in service VM 62 (e.g., one of the applications 68 in service OS 64) may attempt to access sTPM 66 by calling a standard TPM function with standard parameters. That function may access addresses associated with sTPM 66, as shown at block 212. As illustrated at block 214, vTPM manager 88 may then trap the attempt to access sTPM 66. For example, MMIO trap 102 may intercept communications from pv-TPM-driver 67 and direct them to vTPM manager 88, via TPM device model 89.

As shown at block 220, vTPM manager 88 then determine whether the access request should be allowed. For instance, vTPM manager 88 may have a list of approved functions for virtual TPMs, and vTPM manager 88 may only allow calls that involve an approved function. Alternatively, vTPM manager 88 may have a blacklist of functions not to be allowed. In one embodiment, most functions are approved, except for a few, like force clear, take ownership, etc. As shown at block 222, if the access request does not meet the predetermined conditions for allowance, vTPM manager 88 may drop the request. On the other hand, if the access request meets a predetermined condition for allowance, vTPM manager 88 may process the requested vTPM operation with the context from sTPM 66, as shown at block 224. If necessary, when processing the requested vTPM operation for service OS 64, vTPM manager 88 may access hardware TPM 44, via TPM driver 87. VTPM manager 88 may then return the result to pv-TPM-driver 67, as depicted at block 226. The process may then end.

Similarly, a user program within user applications 58 or user OS 54 may attempt to access sTPM 56 by calling a function provided by the native TPM library associated with TPM driver 57. These kinds of requests may also be handled in the manner illustrated in FIG. 2.

FIG. 3 illustrates a process that may operate more or less in parallel with the operations of FIG. 2. As shown at block 240 of FIG. 3, in the beginning of the illustrated process, a program in service VM 62 may attempt to access hTPM 44 by calling a function from the library of pv-TPM-driver 67. The program attempting to access TPM 44 may be a part of service OS 64, for instance. The function or program from the library may then attempt to access memory locations associated with hTPM 44, as shown at block 242. As illustrated at block 244, vTPM manager 88 may then trap the attempt to access hTPM 44 by pv-TPM-driver 67.

As shown at block 250, vTPM manager 88 then determines whether the access request should be allowed. For instance, vTPM manager may have a list of approved functions for hTPM 44 (e.g., TPM quote, TPM non-volatile memory accesses, etc.), and vTPM manager 88 may only allow calls that involve an approved function. Alternatively, vTPM manager 88 may have a blacklist of functions not to be allowed. As shown at block 252, if the access request does not meet the predetermined conditions for allowance, vTPM manager 88 may drop the request. On the other hand, if the access request meets a predetermined condition for allowance, vTPM manager 88 may send the request or command to hTPM 44 and then return the result to pv-TPM-driver 67, as shown at blocks 254 and 256. The process may then end.

In one embodiment, service OS 64 is not permitted to have complete control of hardware TPM 44 under any circumstances, and neither is any other VM, except for vTPM VM 80. However, to accommodate isolated cases where service OS 64 may need access to hardware TPM capabilities (e.g. for attestation), processing system 20 allows partial access to hardware TPM 44 from a trusted VM (e.g., service VM 62) by using pv-TPM-driver 67, along with filtering rules, as discussed above. Thus, service OS 64 may use pv-TPM-driver 67 to communicate with the vTPM for service VM 62 via vTPM manager 88.

Management applications 78 may provide other types of virtualization services, such as providing for virtualization of NICs, I/O devices, and other devices, other than the TPM. In one embodiment, management VM 70 contains virtual machine management programs other than vTPM manager 88 and MMIO trap 102.

Service OS 64 may also provide services such as authentication of remote entities, enforcement of security policies, and other functions for supporting remote management of processing system 20.

In the embodiment of FIG. 1, the entire vTPM subsystem is partitioned in a separate vTPM partition (i.e., vTPM VM 80). This increases the security of the solution, as it separates the control logic and data for the vTPM implementation from several non-vTPM related applications, which run in a separate VM (i.e., management VM 70). In one embodiment, the vTPM partition is a virtual machine with minimal OS or monolithic code. However, the vTPM partition is isolated from management VM 70 and from any other VM (e.g., user VM 52 and service VM 62). The isolation of the vTPM implementation also reduces the available surface of attack on the vTPM itself, and therefore provides additional security.

The embodiment of FIG. 1 provides a non-virtual interface for the service OS to communicate with the hardware TPM while also allowing application access to a fully virtualized TPM. Management applications may therefore maintain both a virtual and non-virtual view of the platform. Such an approach allows management applications to intelligently manage the system locally.

As has been described, the processing system of FIG. 1 allows selective filtering of commands for vTPMs and the hTPM, such that commands chosen by service OS applications can be executed in either the vTPM or the hTPM, and can be blocked (via the filters) from the opposing interface. Command filtering provides an additional level of control that prevents accidental misuse. It also provides added security when filters are applied by the VMM, since an attacker must compromise the VMM in addition to the service OS VM to manipulate TPM state.

The methods disclosed above may be used to support VA solutions, as the disclosed techniques allow the service partition to access limited hardware TPM functionality while having access to the complete virtual TPM functionality. Moreover, the disclosed processing system provides for Independent filtering of hTPM and vTPM accesses. The disclosed processing system also provides for separation of hTPM and vTPM accesses from a common VM based on the TPM interface used. In other words, a VM accessing both hardware and virtual TPM can use two completely different interfaces, exposed by two different libraries—native and hardware TPM libraries. This approach may avoid several errors in application code when both kinds of accesses are used.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:
1. A processing system comprising:
a storage medium;
a processing unit in communication with the storage medium;
a hardware trusted platform module (TPM) in communication with the processing unit;
instructions in the storage medium, which, when executed by the processing unit, implement a virtual TPM (vTPM) manager operable to perform operations comprising:

detecting a first request from a service virtual machine (VM) in the processing system, the first request directed to the hardware TPM (hTPM);

in response to detecting the first request, automatically determining whether the first request should be allowed, based at least in part on filter rules for hTPM operations, wherein the filter rules for hTPM operations identify at least one allowed or disallowed operation pertaining to the hTPM;

detecting a second request from the service VM, the second request directed to a software TPM (sTPM) in the processing system;

in response to detecting the second request, automatically determining whether the second request should be allowed, based at least in part on filter rules for vTPM operations;

wherein the sTPM manages both temporal state information and persistent state information for the service VM.

2. A processing system according to claim 1, wherein the vTPM manager is operable to perform operations comprising:

detecting a third request from a user VM in the processing system, the third request to involve access to a second sTPM in the processing system;

in response to detecting the third request, automatically determining whether the third request should be allowed, based at least in part on the filter rules for vTPM operations.

3. A processing system according to claim 1, wherein the vTPM manager comprises part of a virtual machine monitor (VMM).

4. A processing system according to claim 1, wherein:

the operation of detecting the second request comprises trapping an operation from a native TPM driver in the service VM;

the operation of detecting the first request comprises trapping an operation from a para-virtualized TPM driver in the service VM; and the vTPM manager is operable to perform operations further comprising:

allowing the service VM to access the hTPM based on a maintenance TPM driver that is associated with a first library of TPM calls.

5. A processing system according to claim 1, wherein the vTPM manager is operable to perform operations comprising:

preventing the service VM from performing disallowed operations involving the hTPM by automatically dropping the first request in response to a determination that the first request should not be allowed;

preventing the service VM from performing disallowed operations involving the sTPM by automatically dropping the second request in response to a determination that the second request should not be allowed; and allowing a para-virtualized TPM driver, included in the service VM, partial access to the hTPM to gain access to limited hTPM functionality.

6. An apparatus comprising:

a non-transitory machine-accessible medium;

a hardware trusted platform module (TPM); and instructions in the machine-accessible medium, wherein the instructions, when executed in a processing system with the TPM, perform operations comprising:

detecting a first request from a service virtual machine (VM) in the processing system, the first request involving access to the hardware TPM (hTPM);

in response to detecting the first request, automatically determining whether the first request should be allowed, based at least in part on filter rules for hTPM operations, wherein the filter rules for hTPM operations identify at least one allowed or disallowed operation for the hTPM;

detecting a second request from the service VM, the second request involving access to a software TPM (sTPM) in the processing system;

in response to detecting the second request, automatically determining whether the second request should be allowed, based at least in part on filter rules for virtual TPM (vTPM) operations; and allowing a para-virtualized TPM driver, included in the service VM, partial access to the hTPM to gain access to limited hTPM functionality.

7. An apparatus according to claim 6, wherein the operations further comprise:

detecting a third request from a user VM in the processing system, the third request to involve access to a second sTPM in the processing system;

in response to detecting the third request, automatically determining whether the third request should be allowed, based at least in part on the filter rules for vTPM operations.

8. An apparatus according to claim 6, wherein the instructions comprise control logic for a virtual TPM (vTPM) manager.

9. An apparatus according to claim 6, wherein the instructions comprise part of a virtual TPM (vTPM) VM.

10. An apparatus according to claim 6, wherein the instructions comprise part of a virtual machine monitor (VMM).

11. An apparatus according to claim 6, wherein the operation of detecting the second request comprises trapping an operation from a native TPM driver in the service VM; and the operation of detecting the first request comprises trapping an operation from the para-virtualized TPM driver in the service VM.

12. An apparatus according to claim 6, wherein the instructions, when executed, perform further operations comprising:

preventing the service VM from performing disallowed operations involving the hTPM by automatically dropping the first request in response to a determination that the first request should not be allowed; and preventing the service VM from performing disallowed operations involving the sTPM by automatically dropping the second request in response to a determination that the second request should not be allowed.

13. A method, comprising:

a processor based system, coupled to a memory, performing operations comprising:

detecting a first request from a service virtual machine (VM) in a processing system, the first request involving access to a hardware trusted platform module (hTPM) in the processing system;

in response to detecting the first request, automatically determining whether the first request should be allowed, based at least in part on filter rules for hTPM operations;

detecting a second request from the service VM, the second request involving access to a software TPM (sTPM) in the processing system;

in response to detecting the second request, automatically determining whether the second request should be allowed, based at least in part on filter rules for virtual TPM (vTPMI operations allowing a para-virtualized TPM driver, included in the service VM, partial access to the hTPM to gain access to limited hTPM functionality.

14. A method according claim 13, wherein the filter rules for hTPM operations identify at least one allowed or disallowed operation for the hTPM.

15. A method according claim 13, wherein the operations further comprise:
  detecting a third request from a user VM in the processing system, the third request to involve access to a second sTPM in the processing system;
  in response to detecting the third request, automatically determining whether the third request should be allowed, based at least in part on the filter rules for vTPM operations.

16. A method according claim 13, wherein the operation of detecting the second request comprises trapping an operation from a native TPM driver in the service VM;
  the operation of detecting the first request comprises trapping an operation from the para-virtualized TPM driver in the service VM;
  the operations further comprise:
  (a) granting the service VM access to the hTPM via a non-virtual interface; and
  (b) granting an application included in the service VM access to the sTPM via a fully virtualized interface.

17. A method according to claim 13, wherein the operations further comprise:
  preventing the service VM from performing a disallowed operation involving the hTPM by automatically dropping the first request in response to a determination that the first request should not be allowed; and
  preventing the service VM from performing a disallowed operation involving the sTPM by automatically dropping the second request in response to a determination that the second request should not be allowed.

18. A method according to claim 13, wherein the operation of automatically determining whether the first request should be allowed is performed by a vTPM VM manager in the processing system.

19. A method according to claim 13, wherein the operation of automatically determining whether the first request should be allowed is performed by a vTPM VM in the processing system.

20. A method according to claim 13, wherein the operation of automatically determining whether the first request should be allowed is performed by a virtual machine monitor (VMM) in the processing system.

* * * * *

UNITED STATES PATENT AND TRADEMARK OFFICE
CERTIFICATE OF CORRECTION

| | | |
|---|---|---|
| PATENT NO. | : 8,584,229 B2 | Page 1 of 1 |
| APPLICATION NO. | : 11/963336 | |
| DATED | : November 12, 2013 | |
| INVENTOR(S) | : Tasneem Brutch et al. | |

It is certified that error appears in the above-identified patent and that said Letters Patent is hereby corrected as shown below:

In the Claims

Col. 11, line 44, after "calls" insert -- and hTPM calls --

Col. 12, line 65, "(VTPMI" should be -- (vTPM) --

Signed and Sealed this
Third Day of June, 2014

Michelle K. Lee
*Deputy Director of the United States Patent and Trademark Office*